United States Patent
Zang

(10) Patent No.: US 12,429,462 B2
(45) Date of Patent: Sep. 30, 2025

(54) RADIAL FLOW COLUMN FOR CONVEYING A LIQUID PRODUCT THROUGH AN ADSORBER MATERIAL

(71) Applicant: ALBERT HANDTMANN ARMATURENFABRIK GMBH & CO. KG, Biberach/ Riss (DE)

(72) Inventor: Albert Zang, Aulendorf (DE)

(73) Assignee: ALBERT HANDTMANN ARMATURENFABRIK GMBH & CO. KG, Biberach/ Riss (DE)

( * ) Notice: Subject to any disclaimer, the term of this patent is extended or adjusted under 35 U.S.C. 154(b) by 479 days.

(21) Appl. No.: 18/004,438

(22) PCT Filed: Jan. 12, 2022

(86) PCT No.: PCT/EP2022/050530
§ 371 (c)(1),
(2) Date: Jan. 5, 2023

(87) PCT Pub. No.: WO2022/167181
PCT Pub. Date: Aug. 11, 2022

(65) Prior Publication Data
US 2023/0221290 A1    Jul. 13, 2023

(30) Foreign Application Priority Data
Feb. 2, 2021 (DE) ............... 10 2021 102 315.7

(51) Int. Cl.
*G01N 30/60* (2006.01)
*B01D 15/22* (2006.01)
(Continued)

(52) U.S. Cl.
CPC ......... *G01N 30/6026* (2013.01); *B01D 15/22* (2013.01); *G01N 30/14* (2013.01); *G01N 2030/027* (2013.01)

(58) Field of Classification Search
CPC ............... G01N 30/6026; G01N 30/14; G01N 2030/027; B01D 15/22
See application file for complete search history.

(56) References Cited

U.S. PATENT DOCUMENTS

| 4,676,898 | A | 6/1987 | Saxena |
| 4,833,083 | A | 5/1989 | Saxena |

(Continued)

FOREIGN PATENT DOCUMENTS

WO    2012081983 A1    6/2012

OTHER PUBLICATIONS

ISA European Patent Office, International Search Report Issued in Application No. PCT/EP2022/050530, Mar. 25, 2022, WIPO, 5 pages.

*Primary Examiner* — Benjamin L Lebron
(74) *Attorney, Agent, or Firm* — McCoy Russell LLP

(57) ABSTRACT

Described is a radial flow column for conveying a liquid product through an adsorber material, more particularly for radial flow chromatography, having a housing and, arranged therein, an inner and an outer screen, each of which surrounds a longitudinal axis of the housing and between which a radial intermediate space for receiving the adsorber material is formed. The end-face end regions of the inner and outer screen are sealed with respect to the housing in order to convey the product radially through the screens and the adsorber material. Because the radial flow column comprises ring seals for radially sealing the end-face end regions and the ring seals with corresponding sealing faces permit an axial play of the screens in the housing, production tolerances of the screens with respect to one another and in relation to the housing, and longitudinal fluctuations of the screens, can be compensated in a material-preserving manner.

14 Claims, 4 Drawing Sheets

(51) Int. Cl.
  *G01N 30/02* (2006.01)
  *G01N 30/14* (2006.01)

(56) References Cited

U.S. PATENT DOCUMENTS

| | | | |
|---|---|---|---|
| 6,294,090 B1 | 9/2001 | Nussbaumer et al. | |
| 8,287,737 B2 * | 10/2012 | Bielawski | F16J 15/3208 210/656 |
| 2011/0233153 A1 | 9/2011 | Arifin et al. | |
| 2018/0333670 A1 | 11/2018 | Zinic et al. | |

* cited by examiner

SECTION D-D

RADIAL FLOW COLUMN FOR CONVEYING A LIQUID PRODUCT THROUGH AN ADSORBER MATERIAL

CROSS REFERENCE TO RELATED APPLICATIONS

The present application is a U.S. National Phase of International Application No. PCT/EP2022/050530 entitled "RADIAL FLOW COLUMN FOR CONVEYING A LIQUID PRODUCT THROUGH AN ADSORBER MATERIAL," and filed on Jan. 12, 2022. International Application No. PCT/EP2022/050530 claims priority to German Patent Application No. 10 2021 102 315.7 filed on Feb. 2, 2021. The entire contents of each of the above-listed applications are hereby incorporated by reference for all purposes.

TECHNICAL FIELD

The invention relates to a radial flow column according to the preamble of claim 1.

BACKGROUND AND SUMMARY

Radial flow columns of this type are used, for example, for beer stabilization by polyphenol adsorption, in the production of milk for protein adsorption and for chromatography in biotechnology. The respective product is conveyed essentially in a radial direction through an adsorbent material, which is filled into an intermediate space bounded by an inner and an outer screen. Depending on the use case, a flow direction from the outside to the inside or vice versa is possible.

The inner and outer screens respectively have end-face socket rings which hold a screen mesh running essentially tubular-shaped between them. The socket rings are welded to the end face of the housing of the radial flow column in order to seal off the end faces of the screens so that the product can only flow through the screen mesh. The socket rings are then placed on the housing base on the one hand and on the other hand are fixed to a housing cover, which is formed by at least one cover flange.

In order to be able to screw the cover flange tight from above with sufficient sealing effect under tension, the longitudinal dimensions of the screens must be adapted exactly to the housing. For this purpose, the inner and outer screens must also be manufactured relative to each other with comparatively low manufacturing tolerances in the longitudinal direction. In addition to the high manufacturing costs, the fact that the screens expand longitudinally depending on the process temperature and can thus be damaged or, conversely, the range of possible process temperatures is restricted to an undesirable extent is also problematic. It has also been proved to be disadvantageous that the non-detachable welded connection of the screens to the cover does not permit any visual inspection, for example, with regard to contamination of the screen mesh. In addition, it was found that the effectiveness and/or quality of the adsorption process is undesirably impaired by an uneven distribution of the product over the screen circumference on the input side.

There is thus a need for a radial flow column that can eliminate or at least mitigate at least one of the above problems.

The posed problem is solved with a radial flow column according to claim 1. Accordingly, this is used for conveying a liquid product through an adsorber material and, in particular, for radial flow chromatography. The radial flow column comprises a housing and, arranged therein, an inner screen and an outer screen, each of which surrounds a longitudinal axis of the radial flow column and the housing, respectively. A radial intermediate space is formed between the inner screen and the outer screen for receiving the adsorber material. Further, end-face end regions of the inner and outer screens are sealed to the housing to radially convey the product through the screens and adsorber material.

According to the invention, the radial flow column comprises sealing rings for radially sealing the end-face end regions, wherein the sealing rings and sealing surfaces interacting therewith in each case permit an axial play of the screens in the housing.

On the one hand, the axial play enables compensation for manufacturing tolerances of the inner and outer screens in the longitudinal direction, both relative to each other and in relation to the housing. On the other hand, the axial clearance enables compensation for changes in the length of the screens due to temperature fluctuations, for example during production operation, steam sterilization or the like. In both cases, harmful material stresses due to different longitudinal dimensions of the installed screens can be avoided, and thus also stress-related damage to the inner and outer screens.

The radial flow column preferably has a substantially circular cross-section. The longitudinal axis is in particular a central axis of the radial flow column.

The terms "axial" and "radial" always refer to the longitudinal axis of the radial flow column.

The axial direction is synonymous with the longitudinal direction and is preferably vertical when the radial flow column is ready for operation. The specifications "top" and "bottom" also refer to this.

Preferably, the inner and outer screens each have an upper and a lower socket ring on which the sealing surfaces are formed to face radially outward and/or inward. The sealing surfaces can also run parallel to the longitudinal axis. This allows the axial play to be provided in a structurally simple manner. In addition, insertion of the screens into the housing and/or placement of the housing cover on the screens in the axial direction is facilitated.

Preferably, the radial flow column further comprises a central displacement body projecting into the inner screen, at the upper end of which a fastening flange projecting radially beyond the inner screen is formed with sealing seats for the sealing rings for sealing against the inner and outer screens. This allows the screens to be easily sealed together towards the top.

Preferably, the upper socket ring of the inner screen is arranged at an axial distance from the fastening flange. This allows axial play within the axial distance.

Preferably, the displacement body is attached in a suspended manner to a cover flange which closes off the housing towards the top. This allows the displacement body and the screens to be fastened with low stress by means of screw connections.

Preferably, threaded blind holes formed at the end face towards the top of the displacement body are screwed from the outside in a load-bearing manner to through-holes formed on the cover flange. This enables the displacement body to be fastened exclusively from the outside, thus avoiding problematic connecting elements from a hygienic point of view, such as cap nuts, on the side of the displacement body facing the product.

Preferably, an axial gap is formed between the displacement body and the cover flange for conveying the product between at least one connection for an external product line centrally arranged on the cover flange and an outer radial intermediate space for the product formed between the outer screen and the housing. This allows a radial product flow between the connection for the external product line and the outer radial intermediate space for the product. In this respect, both an inflow of product from the external product line and an outflow of product thereto are possible. This enables a simple and radially symmetrical product feed or product discharge via a single central connection.

Preferably, the axial gap then opens substantially in its circumferential entirety into the outer radial intermediate space. This favors a circumferentially uniform distribution of the product, especially in the case of a product inflow through the axial gap. A circumferentially uniform product distribution optimizes the adsorption effect of the adsorber material.

Preferably, the housing and screens are made of stainless steel, wherein the permitted axial play is greater than a linear expansion of the stainless steel at a temperature difference of 100° C. and, in particular, of 150° C.

The stainless steel is, for example, a stainless steel with the material number 1.4404 (316L). Stainless steels with at least equivalent properties in terms of mechanical properties and/or corrosion resistance are also conceivable. This means that the radial flow column is also suitable for comparatively large temperature differences which can occur, for example, during steam sterilization, a CIP process or the like.

Preferably, the inner and outer screens are each detachably connected to the housing at their two end-face end regions. This simplifies inspection of the screens and also enables them to be replaced, for example in the event of changes in mesh size requirements and/or for cleaning purposes. A detachable connection is understood to mean that the sealing rings can be detached from the corresponding sealing surfaces and/or sealing seats without structurally changing the sealing surfaces and/or sealing seats and that these can be reused after cleaning if necessary.

Preferably, the sealing rings each comprise an attachment section for axial positive locking with associated sealing seats and a sealing section for radial sealing of corresponding sealing surfaces. This ensures a stable position of the sealing rings in the longitudinal direction, for example in the event of temperature fluctuations and/or during assembly.

Preferably, the sealing rings then have an essentially L-shaped and/or T-shaped profile. This means that at least one associated profile leg then produces the axial form fit with the sealing seats and at least one associated profile leg is configured as a sealing section.

Preferably, the sealing rings are made of EPDM. This enables a permanently reliable sealing effect both in terms of the required temperature range and the required permanent elasticity of the sealing rings.

Preferably, the sealing rings, associated sealing seats and corresponding sealing surfaces are liquid-tight as a whole up to an input-side process pressure of at least 10 bar. This makes it possible, for example, to prevent product and/or cleaning liquid from migrating behind the sealing rings, which is problematic from a hygienic point of view, both in production operations and in cleaning processes such as CIP processes.

Preferably, the intermediate space for receiving the adsorber material has a volume of 0.02 to 2 $m^3$, in particular 0.1 to 0.5 $m^3$.

BRIEF DESCRIPTION OF THE FIGURES

A preferred embodiment of the invention is shown by a drawing. Therein.

DETAILED DESCRIPTION

Figure 1:
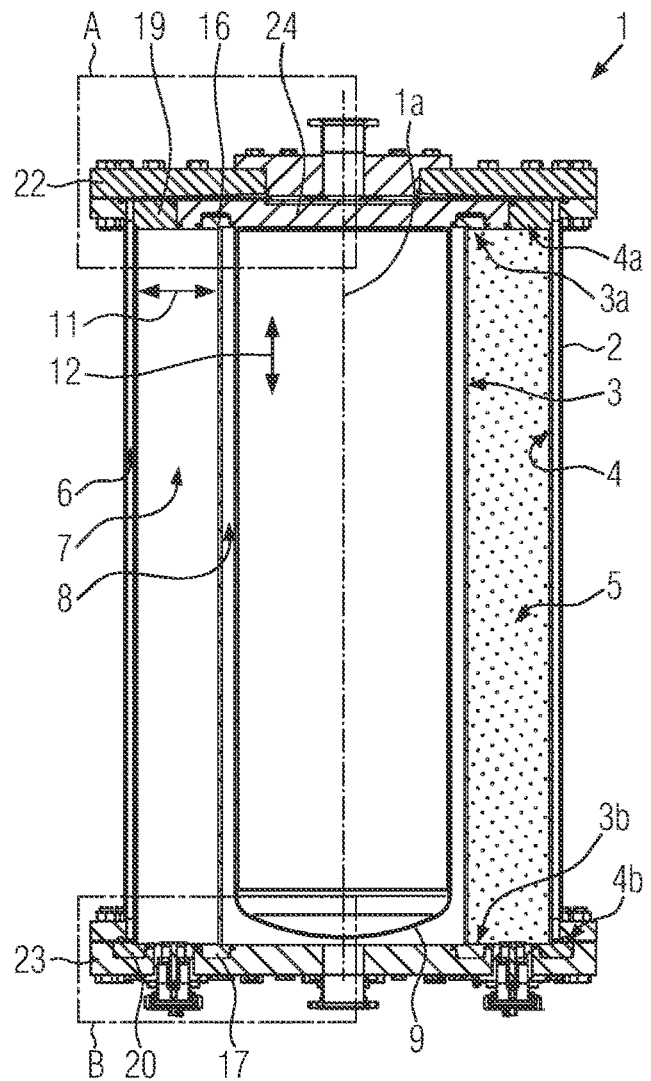
FIG. 1 shows a longitudinal section through the radial flow column and its view from above.
Figure 1:
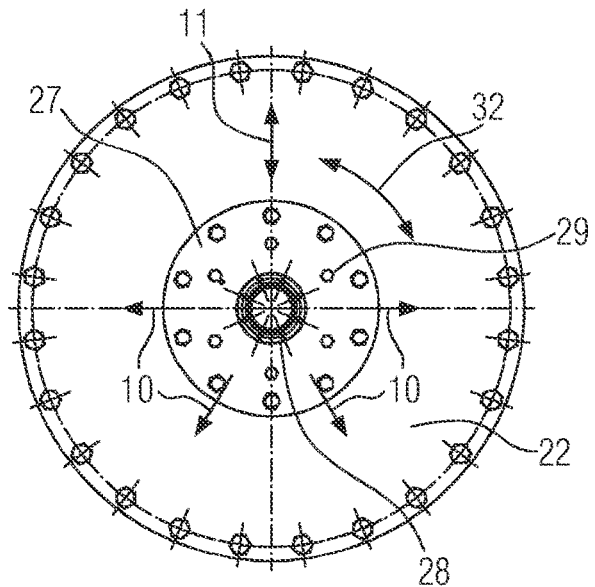

As can be seen from FIG. 1, in a preferred embodiment the radial flow column 1 comprises a substantially cylindrical housing 2, in which a substantially cylindrical inner screen 3 and a substantially cylindrical outer screen 4 are arranged concentrically around a longitudinal axis 1a of the radial flow column 1/the housing 2. A preferably gel-like adsorber material 5 is filled between the inner and outer screens 3, 4 in a principally known manner.

An outer radial intermediate space 6 is formed between the outer screen 4 and the housing 2, and a central radial intermediate space 7 is formed between the inner screen 3 and the outer screen 4. In addition, there is an inner radial intermediate space 8 between the inner screen 3 and a displacement body 9, which is arranged centrally in the housing 2 and also surrounds the longitudinal axis 1a, which largely limits the product flow to an outer partial region of the radial flow column 1 in a known manner.

A product 10 to be processed (FIG. 2) flows successively through the radial intermediate spaces 6, 7, 8 either from the outside to the inside or from the inside to the outside in order to convey the product 10 in the radial direction 11 through the adsorber material 5 and thereby process it. For this purpose, the product 10 is applied on the inlet side, for example, under a process pressure of up to 10 bar.

The invention is essentially characterized by the fact that the inner screen 3 and the outer screen 4 are fastened in the housing 2 such that an axial play 13 of the screens 3, 4 defined in the axial direction 12 is possible with respect to the housing 2. For clarification, the axial play 13 is indicated schematically in FIG. 2.

Figure 2:
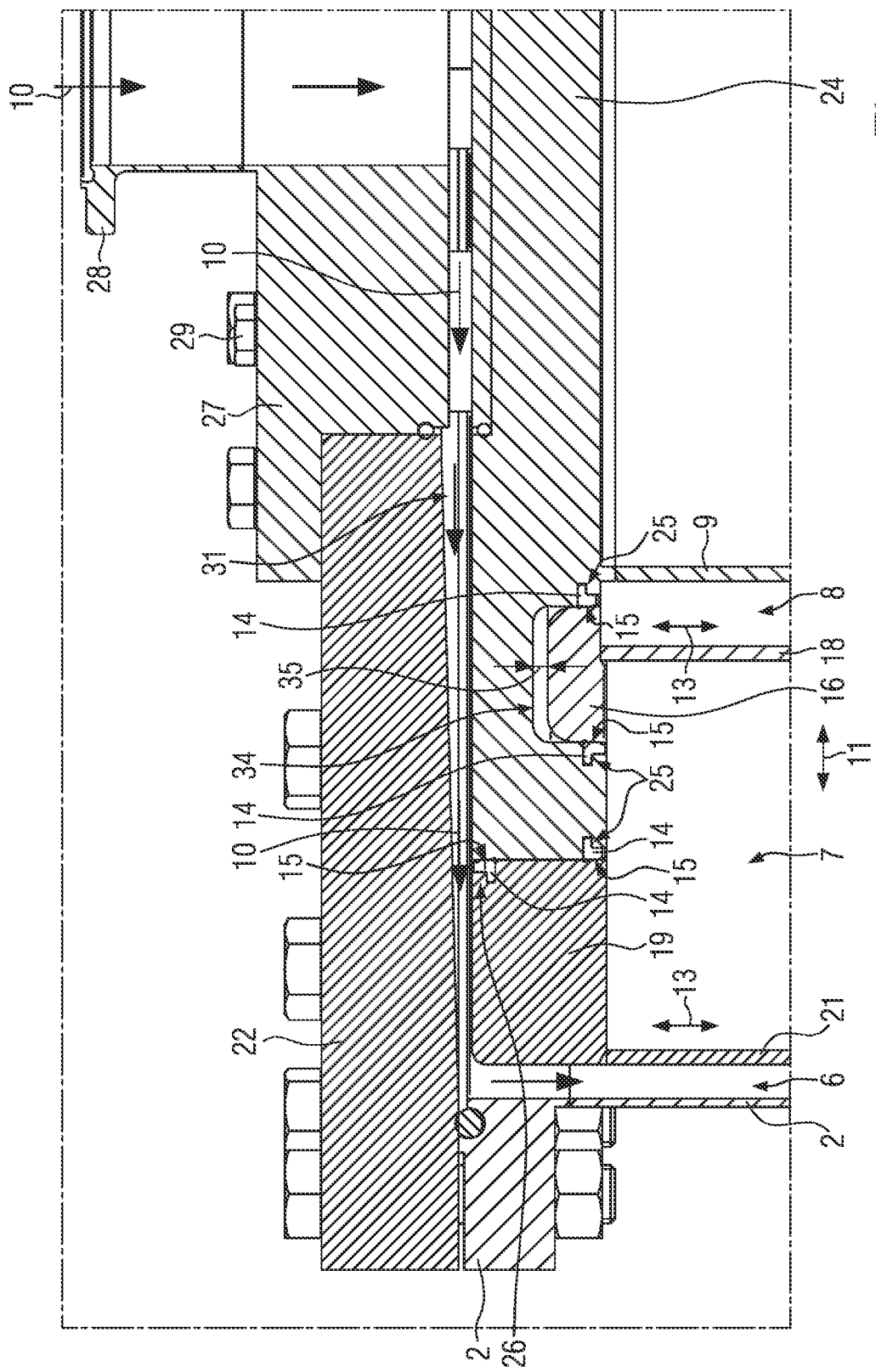
FIG. 2 shows an enlarged section A from FIG. 1.
Figure 3:
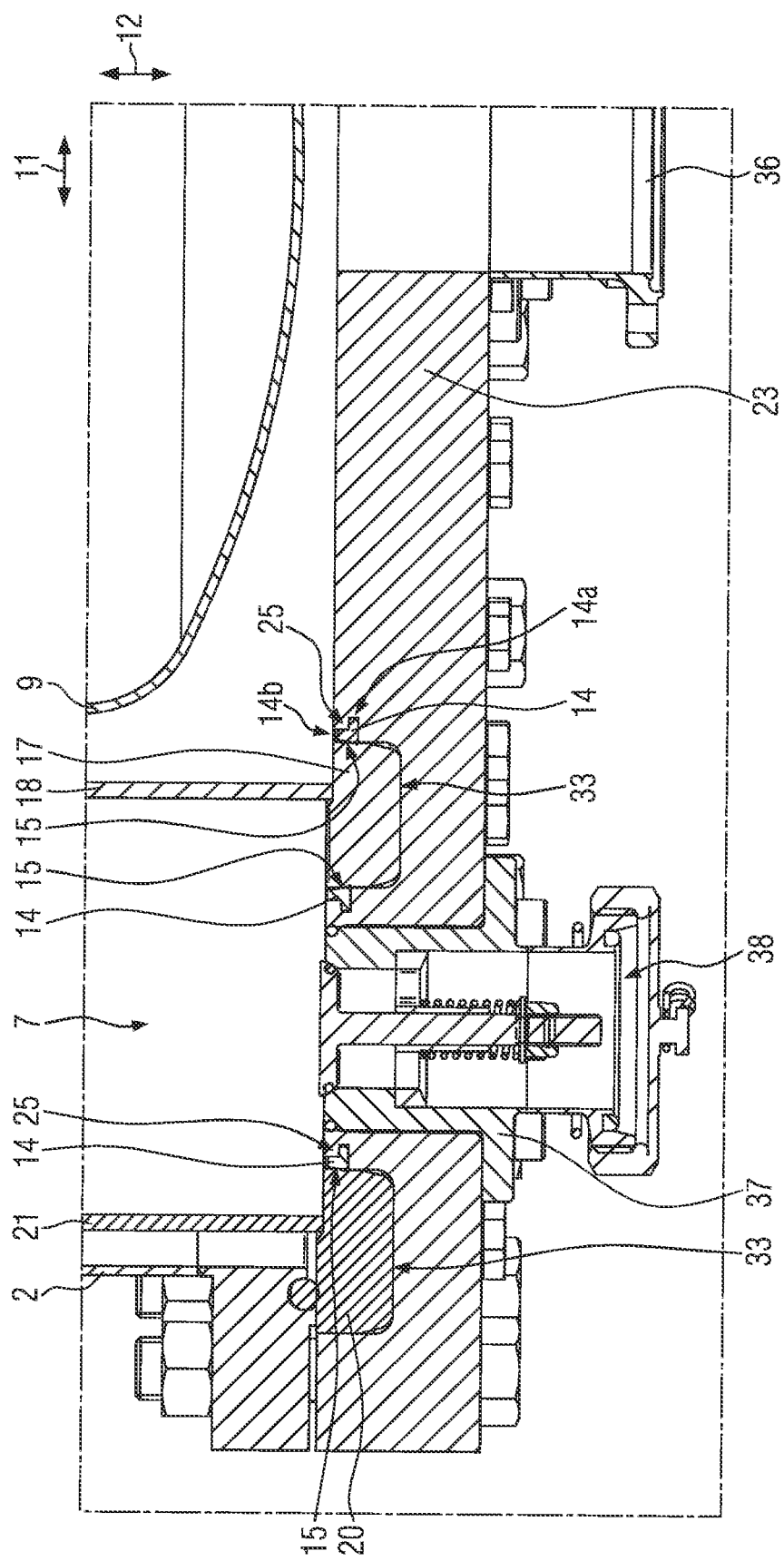
FIG. 3 shows an enlarged section B of FIG. 1.

The axial play 13 is made possible by sealing rings 14 which seal end-face end regions 3a, 3b of the inner screen 3 and end-face end regions 4a, 4b of the outer screen 4 in a fluid-tight manner in the radial direction 11, respectively, with respect to associated sealing surfaces 15, see FIGS. 2 and 3 (partial regions A and B of FIG. 1).

The inner screen 3 consists in a principally known manner of a first (upper) socket ring 16, a second (lower) socket ring 17 and a screen mesh 18 surrounded by the latter.

Accordingly, the outer screen 4 has a first (upper) socket ring 19, a second (lower) socket ring 20, and a screen mesh 21 surrounded thereby.

The housing 2 comprises a cover flange 22 towards the top of the end face end and a base flange 23 towards the bottom of the end face end.

For its suspended fastening to the cover flange 22, the central displacement body 9 comprises an end-face fastening flange 24. Sealing seats 25 for respectively associated sealing rings 14 are formed in the fastening flange 24. In addition, an inward-facing sealing seat 26 can be formed on the first (upper) socket ring 19 of the outer screen 4.

As indicated for the sake of clarity only in FIG. 3, the sealing rings 14 comprise anchoring sections 14a extending substantially in the radial direction 11 to establish an axial form fit with the respective sealing seat 25, 26, and sealing sections 14b extending substantially in the axial direction 12 to establish the required radial sealing action with the associated sealing surfaces 15.

As shown by way of example, the sealing rings 14 can have a substantially L-shaped cross-sectional profile. T-shaped profiles are also conceivable, in which the central leg would then be formed as an anchoring section 14a, or functionally corresponding profiles/sealing cross sections.

Preferably, the cover flange 22 comprises a middle piece 27 screwed tightly thereto and having a central connection 28 for an upper external product line (not shown). The connection 28 may be in the form of a welded-in spigot, as shown.

Figure 4:
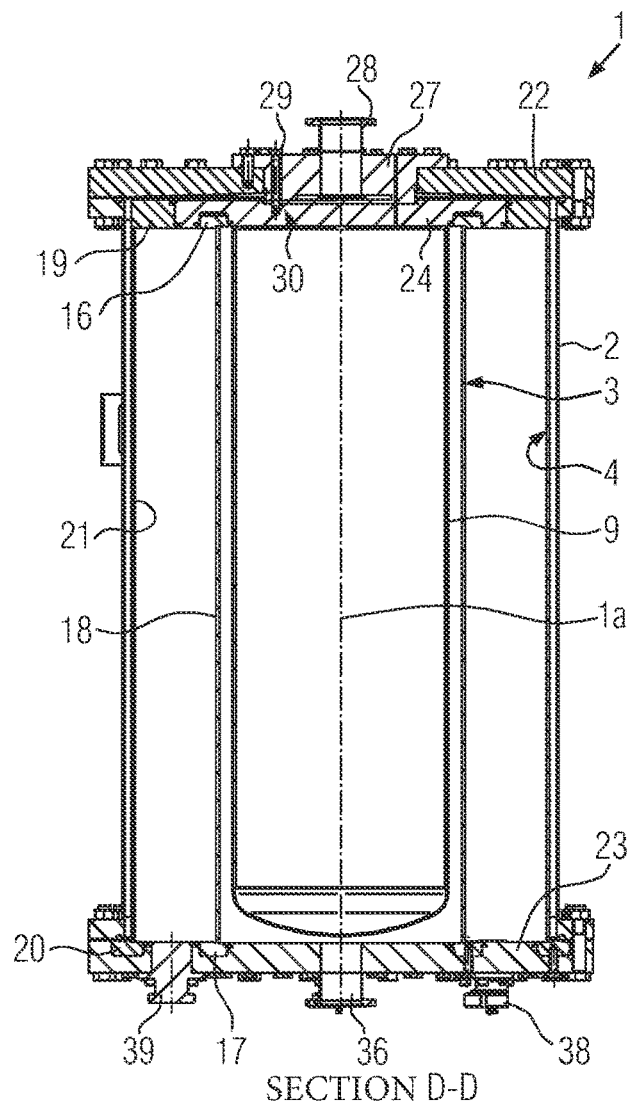
FIG. 4 shows an alternative longitudinal section through the radial flow column and its view from below.
Figure 4:
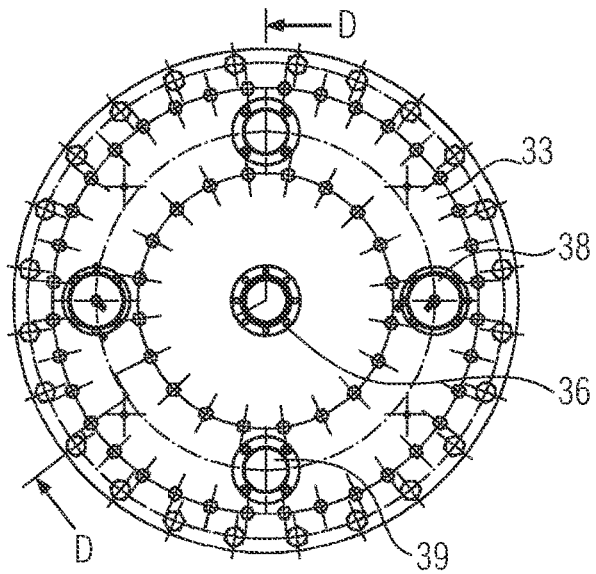

As can be seen from FIG. 4, the fastening flange 24 of the displacement body 9 is attached to the cover flange 22, preferably in a suspended manner from above. For this purpose, the cover flange 22 is screwed to threaded blind holes 30 formed in the fastening flange 24, in particular through through-holes provided on the central middle piece 27, by means of screws 29. The associated connecting elements are then accessible only from the outside so that connecting elements which are questionable from a hygienic point of view, such as cap nuts or the like, on the surfaces of the cover flange 22 and the displacement body 9 which come into contact with the product are dispensable.

As can further be seen in FIG. 2, an axial gap 31 (with gap width defined in axial direction 12) is formed between the cover flange 22 and the fastening flange 24 as well as the upper socket ring 19 of the outer screen 4, through which the product 10 can flow in or out in a substantially radial direction 11. The axial gap 31 acts as a product channel between the central connection 28 and the outer radial intermediate space 6.

The axial gap 31 is penetrated in radial direction 11 and in circumferential direction 32 only by the screws 29 so that the product 10 can flow between the connection 28 and the outer radial intermediate space 6 circumferentially evenly distributed in radial direction 11. This is schematically indicated in the top view of FIG. 1 (below).

In particular, the axial gap 31 opens over the entire circumference into the outer radial intermediate space 6 to allow the product 10 to be distributed as uniformly as possible in the circumferential direction 32 (if the adsorber material 5, as shown, is flowed through from the outside to the inside). In FIGS. 1 and 2, the product flow is schematically indicated by arrows. In principle, however, the reverse flow direction is also conceivable.

A in circumferential direction entirely continuous axial gap 31 improves, in particular, the distribution of the product 10 onto the adsorber material 5 on the input side compared to conventional distribution systems for the product 10 with tubes extending outward in a star shape.

Annular recesses 33 are formed in the bottom flange 23 to accommodate the lower socket rings 17, 20 of the inner and outer screens 3, 4. The associated seal seats 25 are then preferably formed in the lateral flanks of the recesses 33.

A corresponding annular recess 34 is formed in the fastening flange 24 for the upper socket ring 16 of the inner screen 3. Sealing seats 25 are then formed in the lateral flanks of the recess 34.

For the outer screen 4, there is preferably a sealing seat 25 on the outer circumference of the fastening flange 24 and a sealing seat 26 on the inner circumference of the upper socket ring 19.

An axial distance 35 is provided between the upper socket ring 16 of the inner screen 3 and the annular recess 34 in the fastening flange 24, which allows the axial play 13, for example, to compensate for manufacturing tolerances and/or temperature-related changes in length of the inner screen 3.

For the upper socket ring 19 of the outer screen 4, a corresponding axial distance is provided by the axial gap 31.

For the sake of completeness, a centrally formed connection 36 on the bottom flange 23 for a lower external product line (not shown), as well as connections 37, which can optionally be equipped with valves 38 or blind plugs 39 to supply or discharge adsorber material 5, are shown. These components of the radial flow column 1 are known in principle, so that their arrangement and function will not be discussed in detail.

The sealing rings 14 are preferably made of EPDM to achieve the required permanent elasticity and thermal and chemical resistance of the seal.

Supporting components of the housing 2 as well as the inner screen 3, the outer screen 4 and the central displacement body 9 are preferably made of stainless steel, for example of material group 1.4404.

The screen mesh 18, 21, for example, have a mesh size of 20 to 80 μm. The mesh size depends primarily on the particle size of the adsorber material 5.

The axial play 13 is preferably dimensioned such that a length expansion of the inner and outer screens 3, 4 can be compensated for essentially without stress at a temperature difference of at least 100° C. This makes it possible to compensate for relative changes in length of the screens 3, 4 with respect to the housing 2 if, for example, a significantly higher temperature prevails in the area of the inner screen 3 during sterilization and/or cleaning than in the outer area of the housing 2. In addition, the assembly of the radial flow column 1 is largely uncritical with respect to the manufacturing tolerances of the screens 3, 4 in the axial direction 12.

With the sealing rings 14, for example, process pressures of up to 10 bar can be permanently tolerated. This is necessary, for example, to enable flow rates of the product 10 of about 10 to 25 $m^3$ per hour and in particular of 15 to 22 $m^3$ per hour. For this purpose, the central radial intermediate space 7 preferably has a capacity of 0.02 to 2 $m^3$ and, in particular, of 0.1 to 0.5 $m^3$. A corresponding volume of adsorber material 5 can therefore be received.

The described radial flow column 1 also allows easy access to the inner and/or outer screen 3, 4 for maintenance purposes. For example, it is possible to check whether at least one of the screens 3, 4 is inadmissibly contaminated and/or damaged. For this purpose, the cover flange 22 and the fastening flange 24 can be lifted off together in axial direction 12 from the housing 2 and the screens 3, 4 after loosening their screw connection in order to inspect and/or replace the latter. For this purpose, the screens 3, 4 also sit with their lower socket rings 17, 20 detachably in/on the bottom flange 23 and, in contrast, are reliably sealed by the sealing rings 14 in the inserted state.

The sealing rings 14 thus reduce the effort required to manufacture and assemble the radial flow column 1 and also allow higher process temperatures during production and cleaning/sterilization, as well as simplified maintenance of the radial flow column 1.

The invention claimed is:

1. Radial flow column for conveying a liquid product through an adsorber material, comprising a housing and, arranged therein, an inner screen and an outer screen, each of which surrounds a longitudinal axis of the housing and between which a radial intermediate space for receiving the adsorber material is formed, wherein end-face end regions of the inner screen and the outer screen are sealed with respect to the housing in order to convey the liquid product radially through the screens and the adsorber material, with sealing rings for radially sealing the end-face end regions, wherein the sealing rings and sealing surfaces interacting therewith permit axial play of the screens in the housing, wherein the sealing rings comprise an attachment section for an axial form fit with associated sealing seats and a sealing section for radially sealing corresponding sealing surfaces.

2. Radial flow column according to claim 1, wherein the inner and outer screens each have an upper and a lower socket ring, on which the sealing surfaces are formed facing radially outward and/or inward.

3. Radial flow column according to claim 2, further comprising a central displacement body projecting into an inner screen, at an upper end of which a fastening flange projecting radially beyond the inner screen is formed with sealing seats for the sealing rings for sealing against the inner and outer screens.

4. Radial flow column according to claim 3, wherein an upper socket ring of the inner screen is arranged at an axial distance from the fastening flange.

5. Radial flow column according to claim 3, wherein the central displacement body is attached in a suspended manner to a cover flange which closes off the housing towards a top.

6. Radial flow column according to claim 5, wherein threaded blind holes formed on an end face of the displacement body are screwed from the outside to the cover flange in a load-bearing manner.

7. Radial flow column according to claim 5, wherein an axial gap is formed between the central displacement body and the cover flange for conveying the liquid product between at least one connection for an external product line centrally arranged on the cover flange and an outer radial intermediate space for the liquid product formed between the outer screen and the housing.

8. Radial flow column according to claim 7, wherein the axial gap opens substantially in its circumferential entirety into the outer radial intermediate space.

9. Radial flow column according to claim 1, wherein the housing and the screens are made of stainless steel and the permitted axial play is greater than a longitudinal expansion of the stainless steel at a temperature difference of 100° C.

10. Radial flow column according to claim 2, wherein the inner and outer screens are each detachably connected to the housing at their two end-face end regions.

11. Radial flow column according to claim 1, wherein the sealing rings have a substantially L-shaped and/or T-shaped cross-sectional profile.

12. Radial flow column according to claim 1, wherein the sealing rings are made of EPDM.

13. Radial flow column according to claim 1, wherein the sealing rings, associated sealing seats and corresponding sealing surfaces are liquid-tight up to an input-side process pressure of at least 10 bar.

14. Radial flow column according to claim 1, wherein the intermediate space for receiving the adsorber material has a volume of 0.02 to 2 m$^3$.

\* \* \* \* \*